US007830911B2

(12) United States Patent  (10) Patent No.: US 7,830,911 B2
Jimmei  (45) Date of Patent: Nov. 9, 2010

(54) APPARATUS, METHOD AND COMPUTER PROGRAM PRODUCT FOR SELECTING ADDRESS USED IN COMMUNICATION

(75) Inventor: Tatsuya Jimmei, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 405 days.

(21) Appl. No.: 11/773,492

(22) Filed: Jul. 5, 2007

(65) Prior Publication Data

US 2008/0069137 A1 Mar. 20, 2008

(30) Foreign Application Priority Data

Sep. 19, 2006 (JP) ............... 2006-253386

(51) Int. Cl.
*H04J 3/16* (2006.01)
(52) U.S. Cl. ...................... 370/466; 709/240
(58) Field of Classification Search ............. 370/466, 370/475, 331; 709/245, 220, 238
See application file for complete search history.

(56) References Cited

U.S. PATENT DOCUMENTS

2004/0240468 A1* 12/2004 Chin et al. ............... 370/466

2006/0233175 A1* 10/2006 Ge et al. ............... 370/392

OTHER PUBLICATIONS

Draves, Default Address Selection for Internet Protocol Version 6, (IPv6); IETF RFC 3484; Feb. 2003.
Fujisaki, et al, Distributing Default Address Selection Policy Using DHCPv6; IETF Internet Draft, Jun. 2005.
Srisuresh, et al, DNS Extensions to Network Address Translators (DNS-ALG); IETF RFC 2694; Sep. 1999.

* cited by examiner

*Primary Examiner*—Albert T Chou
(74) *Attorney, Agent, or Firm*—Turocy & Watson, LLP

(57) ABSTRACT

A determining unit determines whether a second bit string that forms an Internet Protocol Version 4 (IPv4) address is included in a first bit string that forms an address for Internet Protocol Version 6 (IPv6) connection, and further determines whether the address for IPv6 connection is an extended address extended to an address length of an IPv6 address by adding a prior determined bit to the IPv4 address, when the second bit string is determined to be included in the first bit string. A changing unit changes a priority of the address for IPv6 connection that is determined as the extended IPv6 address. A selecting unit selects preferentially a high level address for IPv6 connection during establishing connection with an external communication apparatus.

7 Claims, 6 Drawing Sheets

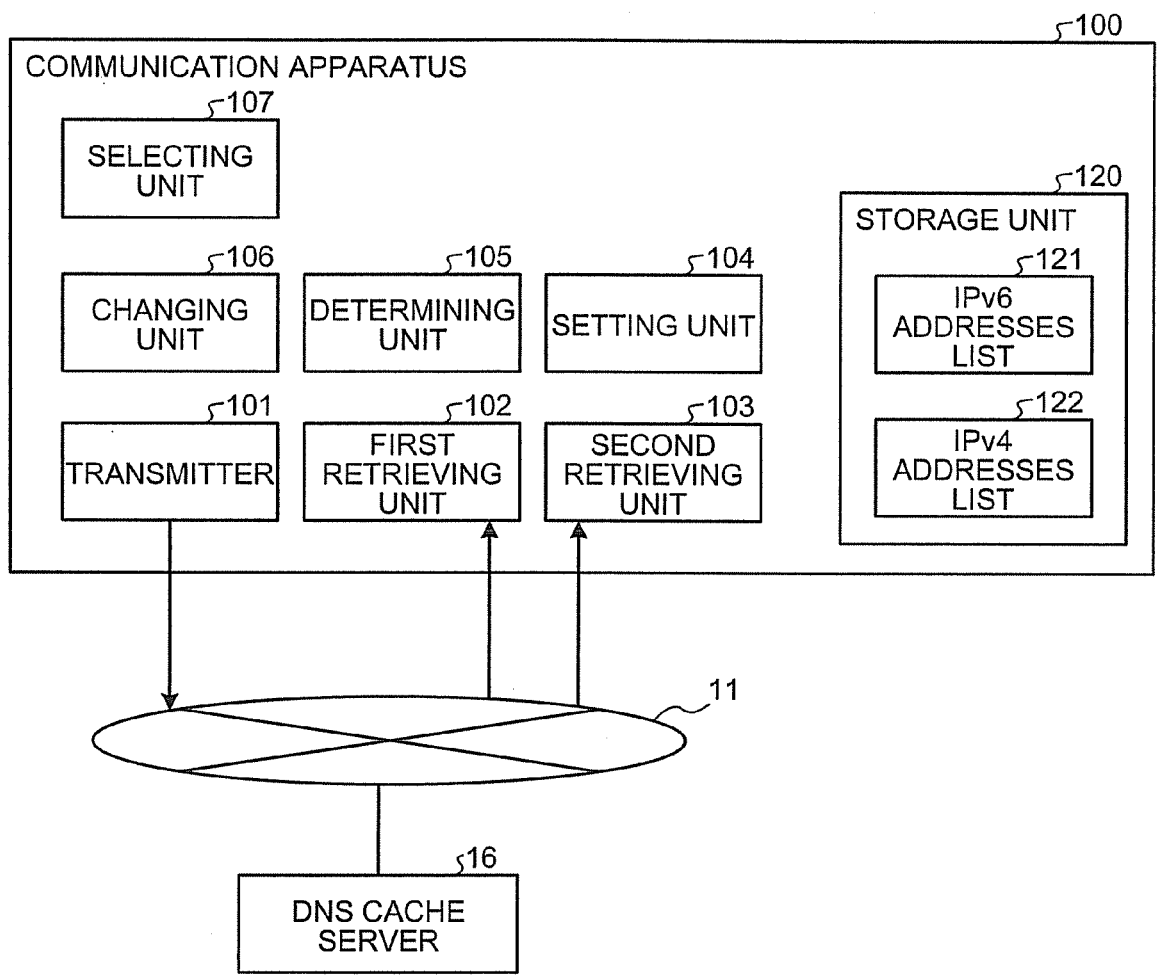

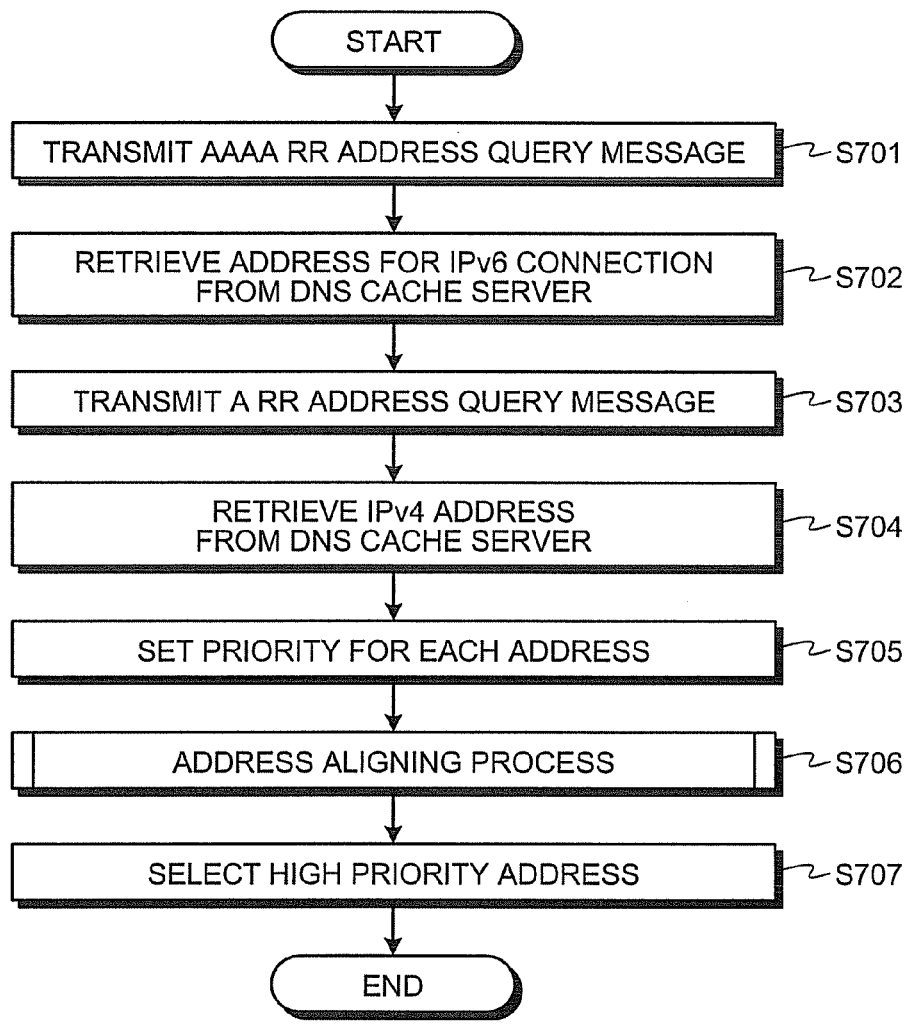

APPARATUS, METHOD AND COMPUTER PROGRAM PRODUCT FOR SELECTING ADDRESS USED IN COMMUNICATION

CROSS-REFERENCE TO RELATED APPLICATIONS

This application is based upon and claims the benefit of priority from the prior Japanese Patent Application No. 2006-253386, filed on Sep. 19, 2006; the entire contents of which are incorporated herein by reference.

BACKGROUND OF THE INVENTION

1. Field of the Invention

The present invention relates to an apparatus, a method, and a program product, which select a destination address that necessitates protocol conversion by distinguishing the destination address with other addresses used in communication.

2. Description of the Related Art

In a commonly used Internet Protocol Version 4 (IPv4) that is a communication protocol of Internet, a 32-bit address (Internet Protocol (IP) address) is defined for using in communication. The IP address is used as an identifier for identifying each device (node). Recently, there is a rapid increase in the Internet connected devices, thus resulting in a shortage of the IP addresses.

To overcome the problem, an Internet Protocol Version 6 (IPv6) is provided that communicates using a 128-bit IPv6 address. In IPv6, not only an address space is widened but a structure of an IP header is also simplified, thereby reducing a load on a router. Further, a mechanism that allocates the IP address automatically is also improved.

However, transition from IPv4 to IPv6 is not immediate. The transition proceeds gradually from an IPv4 realm to an IPv6 realm. To be specific, the transition to IPv6 is carried out while connecting to an existing IPv4 network using a function to carry out conversion from IPv6 to IPv4 (translator) or a tunneling technology.

Further, a Domain Name System (DNS) cache server is being developed that returns with respect to a query for the IP addresses related to a destination communication apparatus that includes IPv4 addresses only, an extended IPv6 address that is generated by adding a predetermined prefix to the IPv4 address and that can be communicated in IPv6. Thus, in response to the query for the addresses related to the destination communication apparatus to which the IPv4 addresses and the IPv6 addresses are allocated, the DNS cache server not only returns the IPv4 addresses and the IPv6 addresses but also returns the extended IPv6 addresses.

When multiple IP addresses are obtained as a result of the query to the DNS, on a commonly used communication apparatus, an attempt is made to establish connection with respect to one address and the communication is continued if the connection is successfully established. If the connection is failed, the attempt is made to establish the connection with other IP address and a process is repeated till the connection is successfully established.

When communication is enabled without translator, communication without using the translator is prioritized. In other words, communication without using the extended IPv6 address is desirable. If the communication is enabled using the translator, the communication may not be carried out due to a bad translator and an IP security function cannot be applied easily.

In R. Draves et al., "RFC3484, Default Address Selection for Internet Protocol version (IPv6)" [online], February 2003, retrieved from the Internet: (URL:http://www.ietf.org/rfc/rfc3484.txt)(hereinafter, abbreviated as a document 1), a framework is regulated for specifying a priority of a destination address according to a specific prefix. However, the problem mentioned earlier can be resolved by lowering the priority of the address that matches with the prefix used in the extended IPv6 address than the priority of the other addresses.

Further, in T. Fujisaki et al., "Distributing Default Address Selection Policy using DHCPv6" [online], Jun. 9, 2005, retrieved from the Internet: (URL:http://www.nttv6.net/dass/draft-fujisaki-dhc-addr-select-opt-00.txt)(hereinafter, abbreviated as a document 2), a technology is recommended that carries out a self-distribution of the priority for the addresses using a Dynamic Host Configuration Protocol Version 6 (DHCPv6). By using the technology, a desired priority can be specified without performing any specific settings on a source communication apparatus.

However, in the documents 1 and 2, manual settings by an administrator of the source communication apparatus or using an external node such as a DHCPv6 server is needed. For example, in the document 1, adding entries related to the prefix for the extended IPv6 address is needed in policy table. Because the prefix differs according to the settings of the translator, explicit settings by the administrator are needed. In the document 2, because the DHCPv6 is used, the manual settings on the source communication apparatus are not needed, thereby causing an extra load of setting or controlling the DHCPv6 server.

Further, in the document 2, because the self-distribution of the priority is needed from the DHCPv6 server, processing load for controlling the priority of each address on DHCPv6 server is increased.

SUMMARY OF THE INVENTION

According to one aspect of the present invention, a communication apparatus, includes a first retrieving unit configured to retrieve Internet Protocol Version 6 (IPv6) connecting addresses for connecting to an external communication apparatus on a network; a second retrieving unit configured to retrieve an Internet Protocol Version 4 (IPv4) address assigned to the external communication apparatus; a setting unit configured to set for each retrieved IPv6 connecting addresses, a priority for representing a level preferably used when connecting to the external communication apparatus; a determining unit configured to determine for each retrieved IPv6 connecting addresses, whether a second bit string that forms the retrieved IPv4 address is included in a first bit string that forms the IPv6 connecting address; a changing unit configured to change the priority of the IPv6 connecting address that is determined that the second bit string is included in the first bit string from among the retrieved IPv6 connecting addresses; and a selecting unit configured to select a IPv6 connecting address having a higher priority during establishing a connection with the external communication apparatus.

According to another aspect of the present invention, a n address selection method includes retrieving IPv6 connecting addresses for connecting to an external communication apparatus on a network; retrieving an IPv4 address assigned to the external communication apparatus; setting for each retrieved IPv6 connecting address, a priority for representing a level preferably used when connecting to the external communication apparatus; determining for each retrieved IPv6 connecting address, whether a second bit string that forms the retrieved IPv4 address is included in a first bit string that forms the IPv6 connecting address; changing the priority of the IPv6 connecting address that is determined that the second bit string is included in the first bit string from among the retrieved IPv6 connecting addresses; and selecting a IPv6 connecting address having a higher priority during establishing a connection with the external communication apparatus.

A computer program product according to still another aspect of the present invention causes a computer to perform the method according to the present invention.

BRIEF DESCRIPTION OF THE DRAWINGS

FIG. 3 is a block diagram of the communication apparatus according to the present embodiment;

FIG. 4 is a schematic diagram showing an example of a data structure of an IPv6 addresses list;

FIG. 5 is a schematic diagram showing the example of the data structure of an IPv4 addresses list;

FIG. 6 is a schematic diagram showing the example of a response message that is returned from a DNS cache server;

FIG. 7 is a flowchart of an address selection process according to the present embodiment;

DETAILED DESCRIPTION OF THE INVENTION

Exemplary embodiments of the apparatus, the method, and the computer program product according to the present invention are explained in detail below with reference to the accompanying drawings.

A communication apparatus according to the present embodiment compares an Internet Protocol Version 4 (IPv4) address and an Internet Protocol Version 6 (IPv6) address that are retrieved from a Domain Name System (DNS) cache server and determines whether the retrieved IPv6 address is an extended IPv6 address that is generated by adding a prefix to the IPv4 address and after changing a priority of the extended IPv6 address, selects an address for using in connection.

Figure 1:
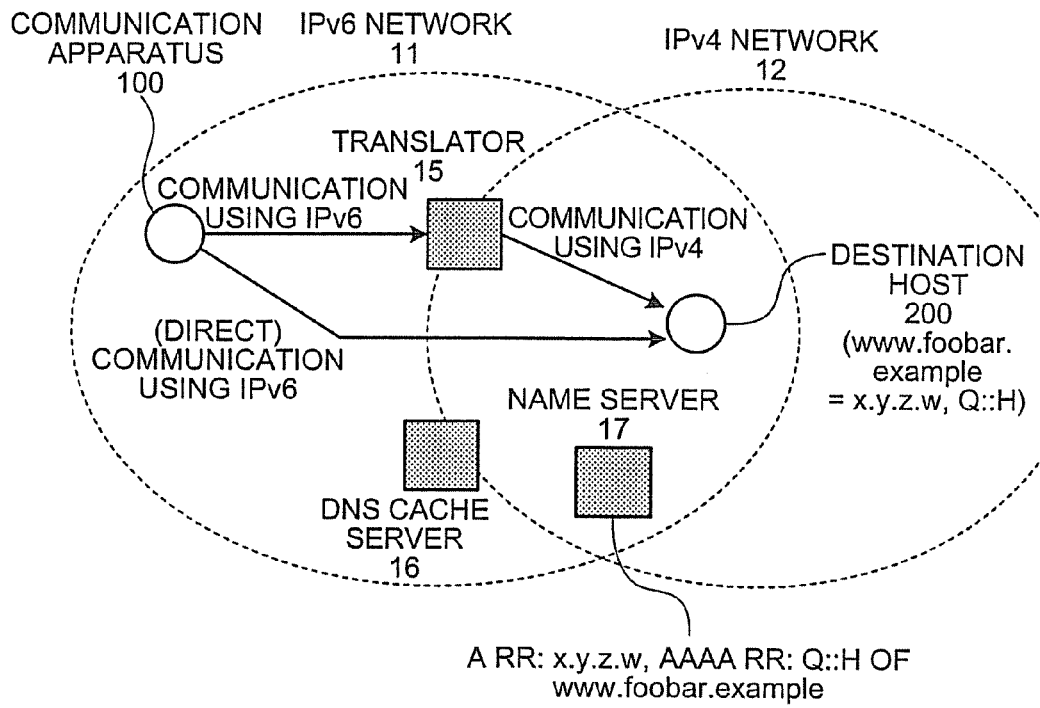
FIG. 1 is a schematic diagram showing an entire network that includes a communication apparatus according to the present embodiment.

As shown in FIG. 1, a communication apparatus 100 is connected to an IPv6 network 11 and communicates using an IPv6 with a destination host 200 that is an external communication apparatus connected to the IPv6 network 11 and an IPv4 network 12.

In the present embodiment, as assumed in a process of transition from IPv4 to IPv6, the IPv6 network 11 and the existing IPv4 network 12 are connected using a function to carry out conversion from IPv6 to IPv4 or a tunneling technology.

The IPv6 network 11 includes a translator 15 that carries out protocol conversion between the IPv6 network 11 and the IPv4 network 12, a name server 17 of a DNS that controls addresses of a domain (foobar.example) in which the destination host 200 is included, and a DNS cash server 16 that processes a query for the address from the communication apparatus 100.

Because the destination host 200 is connected to both the IPv6 network 11 and the IPv4 network 12, in addition to the IPv4 address "x.y.z.w", the IPv6 address "Q::H" is also assigned and an Address Resource Record (A RR) and AAAA RR of the DNS corresponding to the respective address are registered in the name server 17.

For explaining a function of the translator 15, a method for communication between a destination host 300 that is connected to the IPv4 network 12 only and the communication apparatus 100 is explained.

Figure 2:
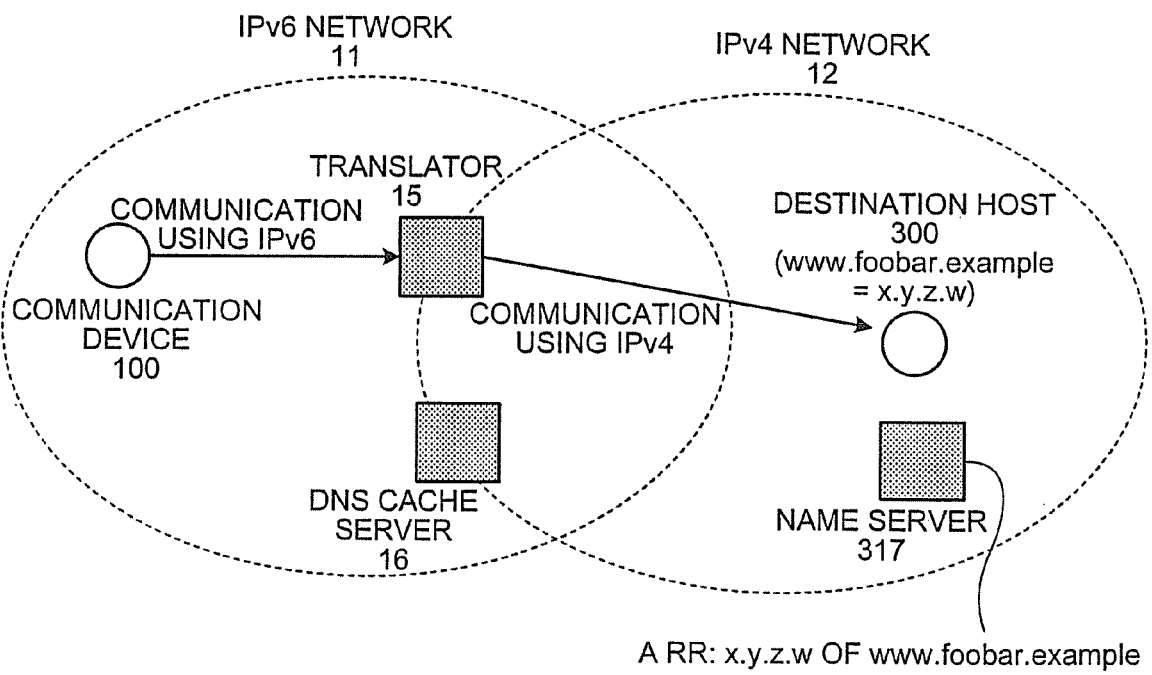
FIG. 2 is the schematic diagram showing the entire network that includes a destination host that is only connected to an IPv4 network.

As shown in FIG. 2, an Internet Protocol (IP) address of the destination host 300 that is connected to the IPv4 network 12 is looked up from the communication apparatus 100 using the DNS. The IPv6 network 11 and the IPv4 network 12 are connected via the translator 15.

The communication apparatus 100 queries the DNS cache server 16 about the address of "www.foobar.example" that is a Fully Qualified Domain Name (FQDN) of the destination host 300. The process is called as a forward lookup that looks up the IP address from the FQDN.

An application that operates on the communication apparatus 100 issues a library call to a DNS resolver that is stored in the device itself. Upon receiving the query, the resolver sends the query to the DNS cache server 16 and requests for the IPv6 address (AAAA RR that is a resource record of the DNS) corresponding to the "www.foobar.example".

Further, it is assumed that the DNS cache server 16 is operated on a device that is different from the translator 15. However, the DNS cache server 16 can be installed on the same device.

Upon receiving the query from the communication apparatus 100, the DNS cache server 16, based on a queried domain name, queries a name server 317 that controls a "foobar.example" zone about the AAAA RR. If the name server 317 can control the "foobar.example" zone, regardless of an installation location, the installation is carried out in the location that is in a vicinity of the normal destination host 300. It is assumed that the name server 317 is connected to the IPv4 network 12.

However, because only the A RR for IPv4 is registered in the name server 317, the request is failed and the DNS cache server 16 cannot retrieve the AAAA RR.

Next, the DNS cache server 16 queries the name server 317 about the A RR of IPv4 address with the same name (www.foobar.example). When the query is succeeded, for example, in response to the query, "x.y.z.w" is returned as the IPv4 address of the "www.foobar.example" that is assumed as the IPv4 address of the "www.foobar.example".

The DNS cache server 16 that is already aware of an IPv6 prefix (P) used for conversion to the IPv4 network 12, returns AAAA RR that includes an address "P::x.y.z.w" as the response with respect to the query made for "www.foobar.example" from the communication apparatus 100. "P::x.y.z.w" is the extended IPv6 address of the IPv4 address "x.y.z.w" (32-bit integer) and "P::x.y.z.w" is a syntax in which the IPv4 address is embedded into low-order 32 bits and high-order 92 bits is used as the prefix.

The communication apparatus 100 sends a connection request such as "connect P::x.y.z.w" with respect to "P::x.y.z.w" via the translator 15 that carries out translation from IPv6 to IPv4.

The translator 15 retrieves the IPv4 address "x.y.z.w" from a low-order 96th bit of a destination address and establishes connection with the destination host 300 using IPv4. If the connection is successfully established, the translator 15 connects IPv4 with IPv6, thereby enabling the communication between the communication apparatus 100 and the destination host 300.

When connecting from the communication apparatus 100 to the destination host 200 that is connected to the IPv6 network 11 and the IPv4 network 12 as shown in FIG. 1, as a rule, the connection is established by using the similar method shown in FIG. 2.

For example, the communication apparatus 100 attempts to communicate with the destination host 200. The communication apparatus 100 requests the DNS cache server 16 for the AAAA RR with respect to the "www.foobar.example" that is a name of the destination host 200. The DNS cache server 16 queries the name server 17 and obtains AAAA RR corresponding to the IPv6 address "Q::H".

The DNS cache server 16 queries about the A RR with respect to the same name and obtains the A RR corresponding to the IPv4 address "x.y.z.w". From the A RR, the DNS cache server 16 generates the extended IPv6 address "P::x.y.z.w" by adding the predetermined prefix (P) to the IPv4 address and the AAAA RR corresponding to the extended IPv6 address "P::x.y.z.w" and by matching with the AAAA RR corresponding to "Q::H", responds to the communication apparatus 100.

Thus, regardless of types of Domain Name System Resource Records (DNS RR) that are included in a communication destination node, responding the AAAA RR for conversion enables the maximum connectivity even if a quality of the IPv6 network 11 is reduced.

For example, when the communication apparatus 100 tries to establish a connection to the destination host 200, even if it initially fails because address "Q::H" is unreachable, the connection can be established successfully with "P::x.y.z.w" via the translator 15.

The status mentioned earlier may occur in an early stage of transition to IPv6 if the IPv6 network is not well managed in an experimental site or if the IPv6 connectivity depends on such technologies that have overhead as tunneling. Further, because the IPv6 address and the extended IPv6 address that are assigned to the destination host 200 are the addresses that can be used in the connection using the IPv6 network 11, hereinafter a combination of both the addresses is called an address for IPv6 connection.

Next, a structure of the communication apparatus 100 is explained in detail with reference to FIG. 3. As shown in FIG. 3, the communication apparatus 100 includes a storage unit 120, a transmitter 101, a first retrieving unit 102, a second retrieving unit 103, a setting unit 104, a determining unit 105, a changing unit 106, and a selecting unit 107.

The storage unit 120 stores therein the IPv6 addresses and the IPv4 addresses that are retrieved from the DNS cache server 16 and further includes an IPv6 addresses list 121 and an IPv4 addresses list 122. The storage unit 120 can be structured using all commonly used storage mediums such as a Random Access Memory (RAM), a Hard Disk Drive (HDD), an optical disk, a memory card.

The IPv6 addresses list 121 stores therein the address for IPv6 connection that is returned from the DNS cache server 16 with respect to the query for the AAAA RR. As shown in FIG. 4, the IPv6 addresses list 121 stores therein a correspondence between the address for IPv6 connection and the priority that indicates a level of the prioritized IPv4 address when connecting to the destination host 200.

The IPv4 addresses list 122 stores therein the IPv4 address that is returned from the DNS cache server 16 with respect to the query for A RR. As shown in FIG. 5, the IPv4 addresses list 122 stores therein the correspondence between the IPv4 address and the priority.

The transmitter 101 transmits to the DNS cache server 16, an address query message that queries about the AAAA RR or an A RR of the destination host 200.

The fist retrieving unit 102 receives a response message that is returned from the DNS cache server 16 with respect to the address query message that queries about the AAAA RR and retrieves the address for IPv6 connection from the AAAA RR of the response message.

The second retrieving unit 103 receives the response message that is returned from the DNS cache server 16 with respect to the address query message that queries about the A RR and retrieves the IPv4 address from the A RR of the response message.

As shown in FIG. 6, a format of the response message is similar to a response with respect to the address query message that is used in a normal DNS. An answer resource record that includes data of the returned address is stored next to a DNS header. Further, after the answer resource record an authority that indicates that the responded name server is an official name server of a domain and additional data is stored.

As shown in FIG. 6, the first retrieving unit 102 and the second retrieving unit 103 retrieve the address of the queried destination host 200 from the answer resource record of the response message. Further, the first retrieving unit 102 and the second retrieving unit 103 save the retrieved address for IPv6 connection and the IPv4 address in the IPv6 addresses list 121 and the IPv4 addresses list 122 respectively.

The setting unit 104 sets the priority for the retrieved address for IPv6 connection and the IPv4 address. The setting unit 104 allocates a default predetermined priority at the time of retrieving each address. For example, when the priority is indicated in an integer from one to ten (one is the minimum priority and ten is the maximum priority), the setting unit 104 allocates the default priority five to each address and saves into the IPv6 addresses list 121 and the IPv4 addresses list 122.

The determining unit 105 determines whether the retrieved address for IPv6 connection is the extended IPv6 address. In the extended IPv6 address, the predetermined prefix is added to the IPv4 address so that the address can be used in an environment of the IPv6 network 11 and is extended to a bit length (128 bits) that is similar to the IPv6 address.

To be specific, the determining unit 105 determines whether the address for IPv6 connection is the extended IPv6 address when a bit string that forms the IPv4 address is included in the bit string that forms the address for IPv6 connection. The extended IPv6 address is normally generated upon adding the prefix to the IPv4 address.

The changing unit 106 changes the priority of the extended IPv6 address. To be specific, the changing unit 106 changes a priority value of the extended IPv6 address such that the priority value becomes lower than the priority value of the IPv6 address. For example, the changing unit 106 changes the priority value of the extended IPv6 address from five that is set as default to four, thereby enabling to select by prioritizing a direct communication with the destination host 200 without connecting via the translator 15.

Further, if the connection established via the translator 15 is more stable, the changing unit 106 can set the priority value of the extended IPv6 address greater than the priority value of the IPv6 address.

The selecting unit 107 selects the address having the higher priority than the used address when connecting to the destination host 200.

Next, an address selection process by the communication apparatus 100 according to the present embodiment is explained with reference to FIG. 7.

In an example, a process is explained in which the communication apparatus 100 resolves the address with respect to a terminal name (www.foobar.example) of the destination host 200 and selects an appropriate address to establish the connection with the destination host 200 in a network environment that is shown in FIG. 1.

First, the transmitter 101 transmits to the DNS cache server 16, the AAAA RR address query message of the DNS to retrieve the address for IPv6 connection with respect to the terminal name www.foobar.example) of the destination host 200 (step S701).

The DNS cache server 16 obtains via the name server 17 corresponding to the terminal name, the AAAA RR that includes the IPv6 address "Q::H" of the destination host 200. To obtain the IPv4 address of the same terminal name, the DNS cache server 16 further transmits to the name server 17, the address query message of the A RR and obtains the A RR that includes the IPv4 address "x.y.z.w". The DNS cache server 16 obtains the extended IPv6 address "P::x.y.z.w" that is generated by adding the predetermined prefix to the IPv4 address that is included in the A RR and finally, transmits to the communication apparatus 100, the response message of the DNS that includes two AAAA RR.

Next, upon receiving the response message that is transmitted from the DNS cache server 16, the fist retrieving unit 102 of the communication apparatus 100 retrieves the address for IPv6 connection from the received message (step S702).

Next, to retrieve the IPv4 address with respect to the terminal name (www.foobar.example) of the destination host 200, the transmitter 101 transmits the query message of the A RR to the DNS cache server 16 (step S703).

The DNS cache server 16 obtains the A RR that includes the IPv4 address "x.y.z.w" of the destination host 200 via the name server 17 corresponding to the terminal name and transmits the response that includes the A RR to the communication apparatus 100.

Next, the second retrieving unit 103 of the communication apparatus 100 receives the response message transmitted from the DNS cache server 16 and retrieves the IPv4 address from the received message (step S704).

In the structure shown in FIG. 1, the first retrieving unit 102 and the second retrieving unit 103 obtain the addresses for IPv6 connection "Q::H" and "P::x.y.z.w" and the IPv4 address "x.y.z.w".

Next, the setting unit 104 saves into the storage unit 120, the correspondence between each retrieved address and the default priority (5) (step S705). In the example, the IPv6 addresses list 121 shown in FIG. 4 and the IPv4 addresses list 122 shown in FIG. 5 are saved into the storage unit 120.

Next, an addresses aligning process is executed to align the retrieved addresses according to an order of established connections (step S706). The details of the addresses aligning process are explained later.

After the addresses aligning process, the selecting unit 107 selects the high priority addresses from the aligned addresses, (step S707) and by using the selected addresses, establishes the connection with the destination host 200.

Figure 8:
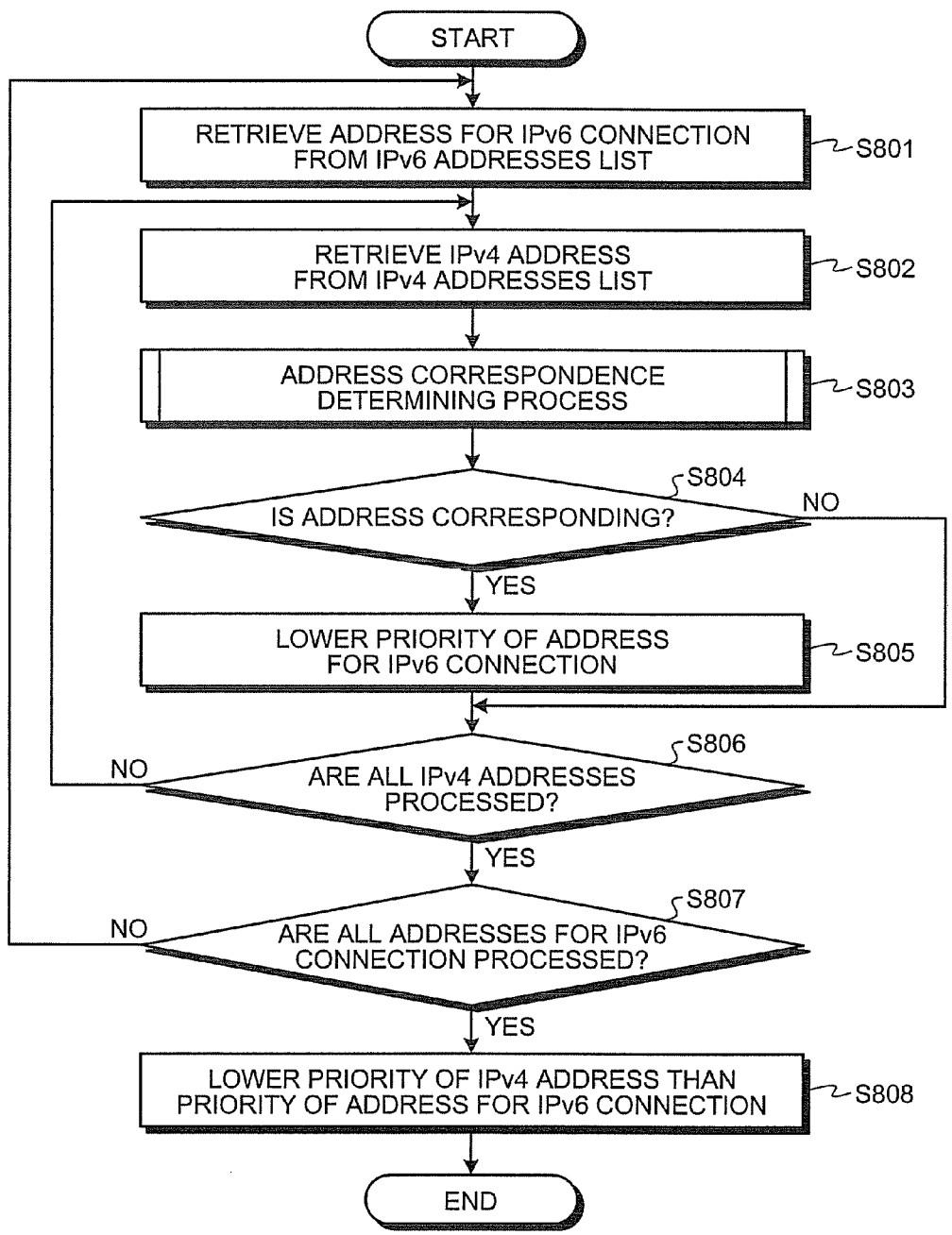
FIG. 8 is the flowchart of an address aligning process.

Next, the addresses aligning process mentioned at step S706 is explained in detail with reference to FIG. 8.

The determining unit 105 retrieves one address for IPv6 connection from the IPv6 addresses list 121 (step S801) and one IPv4 address from the IPv4 addresses list (step S802).

In the example, even if only one IPv4 address ("x.y.z.w") is stored into the IPv4 addresses list 122, a plurality of IPv4 addresses are assigned with the same terminal name for load distribution and the plurality of the IPv4 addresses are stored into the IPv4 addresses list 122. The determining unit 105 retrieves any one of the IPv4 addresses from the plurality of IPv4 addresses that are stored into the IPv4 addresses list 122.

Next, the determining unit 105 determines the correspondence between the retrieved address for IPv6 connection and the IPv4 address and executes an address correspondence determining process that determines whether the address for IPv6 connection is the extended IPv6 address (step S803). The details of the address correspondence determining process are explained later.

Next, by referring to results of the address correspondence determining process, the determining unit 105 determines whether the address for IPv6 connection corresponds with the IPv4 address (step S804). If the address for IPv6 connection corresponds with the IPv4 address (Yes at step S804), the changing unit 106 lowers the priority of the address for IPv6 connection (step S805).

Upon lowering the priority or upon determining at step S804 that the address for IPv6 connection does not correspond with the IPv4 address (No at step S804), the determining unit 105 determines whether all the IPv4 addresses are processed (step S806).

Until all the IPv4 addresses are processed (No at step S806), the determining unit 105 retrieves the next IPv4 address from the IPv4 addresses list 122 and repeats the process (step S802). When all the IPv4 addresses are processed (Yes at step S806), the determining unit 105 determines whether all the addresses for IPv6 connection are processed (step S807).

Until all the addresses for IPv6 connection are processed (No at step S807), the determining unit 105 retrieves the next address for IPv6 connection from the IPv6 addresses list 121 and repeats the process (step S801). When all the addresses for IPv6 connection are processed (Yes at step S807), the changing unit 106 lowers the priority of the IPv4 address than the priority of the address for IPv6 connection (step S808). For example, the changing unit 106 sets the priority of the IPv4 address to one. Due to this, the address for IPv6 connection is prioritized than the IPv4 address and the address for IPv6 connection is used.

Thus, upon determining the correspondence between the address for IPv6 connection and the IPv4 address, if the determining unit 105 determines that the address for IPv6 connection is the extended IPv6 address, by lowering the priority of the extended IPv6 address, the addresses can be aligned to use by prioritizing the IPv6 addresses other than the extended IPv6 addresses.

The example indicating aligning of the addresses by assigning the priority to each address is explained. However, without using the priority, the addresses can be aligned by changing in the IPv6 addresses list 121, a storage position of the address for IPv6 connection that is determined as the extended IPv6 address. For example, the address for IPv6 connection that is determined as the extended IPv6 address can be moved at the end of the list and at the time of connection, the address can be retrieved from the beginning of the list, thereby enabling to select by prioritizing the appropriate address.

Figure 9:
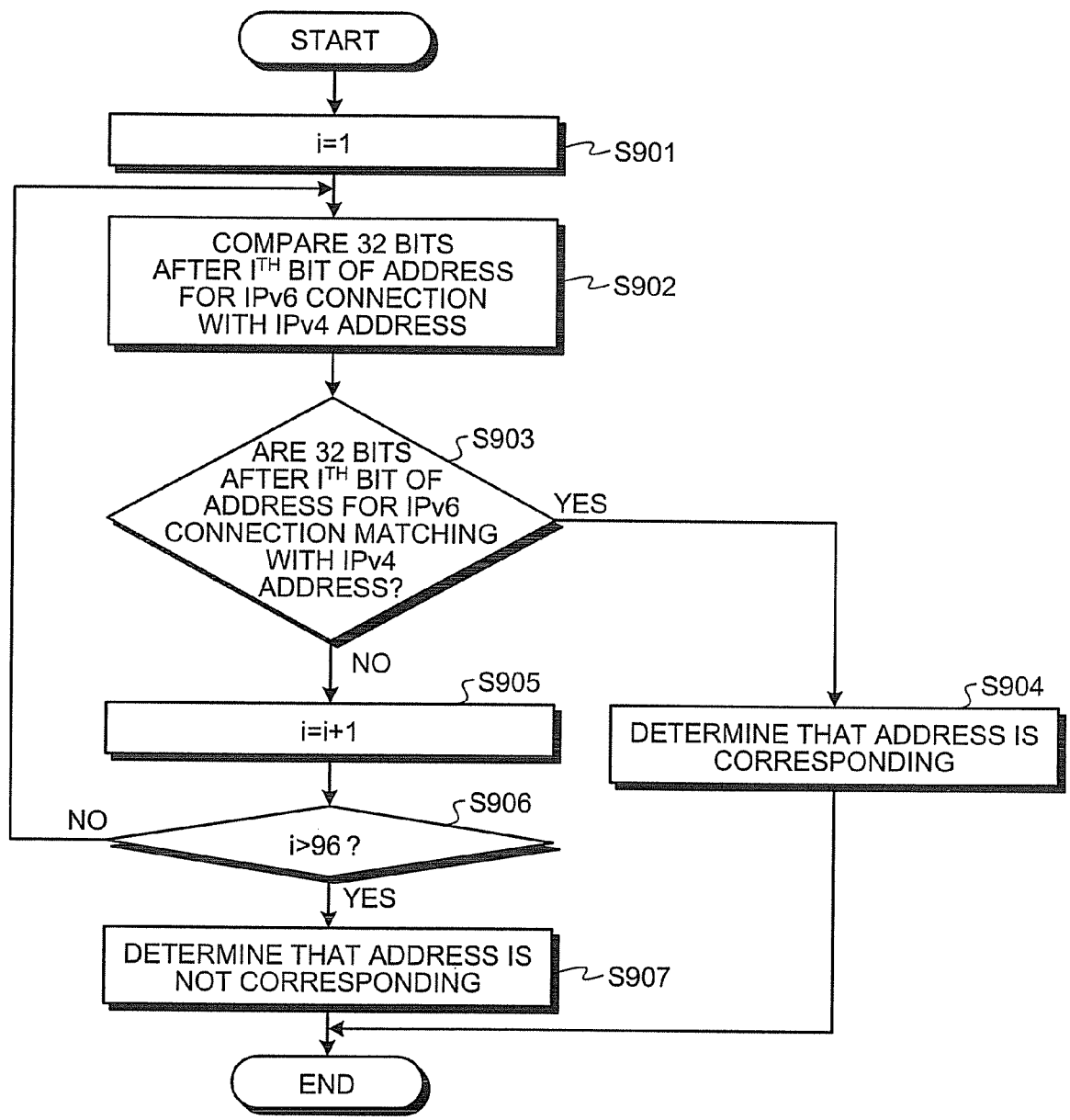
FIG. 9 is the flowchart of an address correspondence determining process.

Next, the address correspondence determining process at step S803 is explained in detail with reference to FIG. 9.

First, the determining unit 105 initializes a counter i to one (step S901) and compares a 32-bit bit string after ith bit of the address for IPv6 connection with the 32-bit bit string that forms the IPv4 address (step S902).

Next, the determining unit 105 determines whether the 32-bit bit string after ith bit of the address for IPv6 connection matches with the 32-bit bit string that forms the IPv4 address (step S903). If the 32-bit bit string after ith bit of the address for IPv6 connection matches with the 32-bit bit string that forms the IPv4 address (Yes at step S903), the determining unit 105 determines that the address corresponds (step S904). If the 32-bit bit string after ith bit of the address for IPv6 connection does not match with the 32-bit bit string that forms the IPv4 address (No at step S903), the determining unit 105 adds one to the counter i (step S905) and determines whether a value of the counter i exceeds 96 (step S906).

If the value of the counter i does not exceed 96 (No at step S906), the determining unit 105 retrieves the next 32 bits (step S902) and repeats the process. If the value of the counter i exceeds 96 (Yes at step S906), the determining unit 105 determines that the address does not correspond (step S907) and the address correspondence determining process ends.

Further, in the present embodiment, it is assumed that the integer of 32 bits represented by "x.y.z.w" does not appear in any consecutive 32 bits of the 128-bit IPv6 address "Q::H". Such an assumption normally holds good if "Q::H" is a common global IPv6 address. A likelihood of matching the consecutive 32 bits in the IPv6 address with 32 bits of IPv4 address is extremely low. Further, the connectivity is not significantly affected even if the extended IPv6 address is prioritized and used due to incorrect determination.

A specific example of an address selection process by the communication apparatus 100 according to the present embodiment is explained next. Similarly as the example mentioned earlier, the process is explained in the example in which the communication apparatus 100 selects the appropriate address to establish the connection with the destination host 200 in a network environment shown in FIG. 1.

In the example, both the "Q::H" and "P::x.y.z.w" addresses for IPv6 connection are retrieved (steps S702 and S704). According to the assumption mentioned earlier, the determining unit 105 determines that the address for IPv6 connection "Q::H" does not correspond with the IPv4 address "x.y.z.w" (step S907). In other words, the determining unit 105 determines that "Q::H" is not the extended IPv6 address for the protocol conversion. Further, the priority of "Q::H" is maintained (No at step S804).

Because 32 bits after 96th bit of the address for IPv6 connection "P::x.y.z.w" match with the IPv4 address "x.y.z.w", the determining unit 105 determines that there is the correspondence between both the addresses (step S904). In other words, the determining unit 105 determines that "P::x.y.z.w" is the extended IPv6 address. Further, the changing unit 106 lowers the priority of "P::x.y.z.w" (step S805).

Further, the changing unit 106 also lowers the priority of the IPv4 address "x.y.z.w" than the priority of two addresses for IPv6 connection (step S808). However, the priority itself of the IPv4 address does not affect effects in the present embodiment. In other words, even if by assigning any priority to the IPv4 address "x.y.z.w" with respect to two addresses for IPv6 connection, the effects in the present embodiment are realized.

Depending upon the results, the selecting unit 107 selects the address for connection in the order of the IPv6 address "Q::H", the extended IPv6 address "P::x.y.z.w"; and the IPv4 address "x.y.z.w". Thus, regardless of the protocol conversion, if the direct communication is enabled only using IPv6, the connection is established using IPv6. If the direct communication using IPv6 is failed due to a poor network, the extended IPv6 address "P::x.y.z.w" for conversion is selected and the connection is established using the protocol conversion that uses the translator 15.

Further, in the present embodiment, the IPv4 address "x.y.z.w" matches with the low-order 32 bits (32 bits after 96 bits) of the corresponding extended IPv6 address "P::x.y.z.w" and the similar effects can be realized even if a starting position of the IPv4 address is not the 96th bit in the address for IPv6 connection.

Further, in the process, all the bit strings are determined, which include the correspondence with the IPv4 address, from the bit strings that form the address for IPv6 connection. To enhance determination efficiency, only the bit strings that start from a particular bit can also be determined. For example, to determine for each boundary of 4, 8, 16, 32, 48, or 64 bits that is a natural bit boundary in a normal calculator, the counter i can be successively increased to 4, 8, 16, 32, 48, or 64. Further the bit determination can also be applied to a particular set of bits.

In the present embodiment, even if the DNS is used to obtain the IP address that corresponds to the terminal name of the destination host 200, other methods can be applied if the IP address of the destination host 200 to which the connection is to be established can be retrieved.

Thus, in the communication apparatus according to the present embodiment, by comparing the IPv4 address and the IPv6 address retrieved from the DNS cache server, whether the retrieved IPv6 address is the extended IPv6 address is determined. After changing the priority of the extended IPv6 address, the addresses can be selected for using in the connection. In other words, an administrator can autonomously select optimal destination addresses without performing manual settings or depending on external devices.

In the environment in which the protocol conversion from IPv6 to IPv4 can be used, when the assigned destination host includes the connectivity and the addresses of both IPv6 and IPv4, upon prioritizing the establishment of the connection only by IPv6, connections can be carried out using the protocol conversion as a next best candidate. Thus, even if the problem occurs in the quality of the IPv6 network, the maximum connectivity can be provided in the optimal sequence. Further, upon obtaining a candidate address, a connection sequence is determined only according to the operations in a host. Because the connection sequence does not depend on the data of an external server, a cost involved in operations of the external server is not required.

Figure 10:
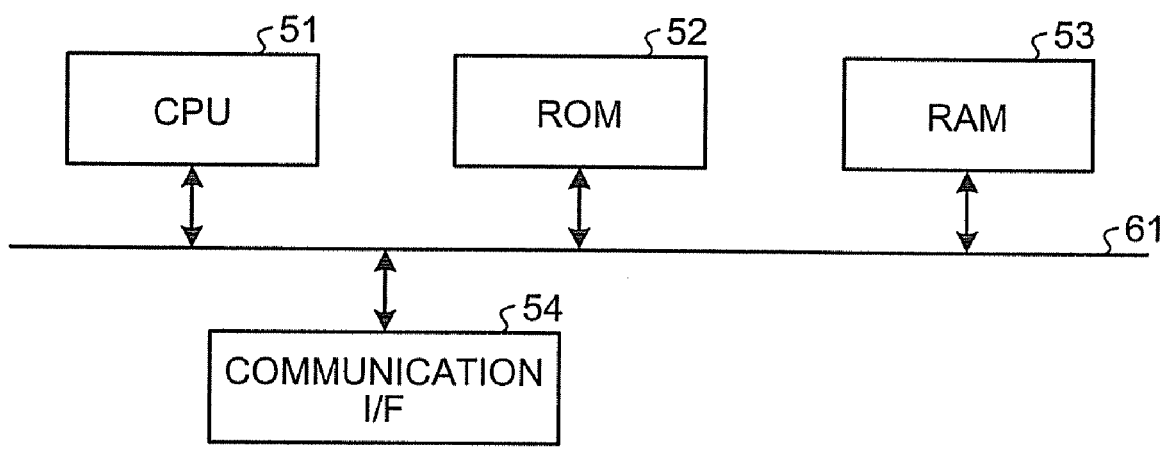
FIG. 10 is the block diagram of a hardware structure of the communication apparatus according to the present embodiment.

As shown in FIG. 10, the communication apparatus 100 according to the present embodiment includes a controller such as a Central Processing Unit (CPU) 51, storage devices such as a Read Only Memory (ROM) 52 and a Random Access Memory (RAM) 53, a communication interface (I/F) 54 that communicates by connecting to the network, external storage devices such as a Hard Disk Drive (HDD), a Compact Disc (CD) drive, a display device such as a display, input devices such as a keyboard and a mouse, and buses 61 that connect each unit that is a normal hardware configuration used by a computer.

An address selection program that is executed on the communication apparatus according to the present embodiment is provided in an installable format or an executable format file that is stored in the storage mediums such as a Compact Disk Read Only Memory (CD-ROM), a flexible disk (FD), a Compact Disk Recordable (CD-R), and a Digital Versatile Disk (DVD) that can be read on the computer.

The address selection program that is executed on the communication apparatus according to the present embodiment can be stored in the computer that is connected to the network such as Internet and can be provided by downloading via the network. Further, the address selection program that is executed on the communication apparatus according to the present embodiment can be provided or distributed via the network such as the Internet.

Further the address selection program according to the present embodiment can be pre-installed on the ROM and provided.

The address selection program that is executed on the communication apparatus according to the present embodiment is a module that includes all the units (the transmitter, the first retrieving unit, the second retrieving unit, the setting unit, the determining unit, the changing unit, and the selecting unit). The CPU 51 (processor) as a hardware reads the address selection program from the storage mediums, executes the program, and loads all the units in a main storage device. All the units are generated in the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
a first retrieving unit configured to retrieve Internet Protocol Version 6 (IPv6) connecting addresses for connecting to an external communication apparatus on a network;
a second retrieving unit configured to retrieve an Internet Protocol Version 4 (IPv4) address assigned to the external communication apparatus;
a setting unit configured to set for each retrieved IPv6 connecting addresses, a priority for representing a level preferably used when connecting to the external communication apparatus;
a determining unit configured to determine for each retrieved IPv6 connecting addresses, whether a second bit string that forms the retrieved IPv4 address is included in a first bit string that forms the IPv6 connecting address;
a changing unit configured to change the priority of the IPv6 connecting address that is determined that the second bit string is included in the first bit string from among the retrieved IPv6 connecting addresses; and
a selecting unit configured to select a IPv6 connecting address having a higher priority during establishing a connection with the external communication apparatus.

2. The apparatus according to claim 1, wherein
the determining unit is configured to determine whether any consecutive 32 bits that form the retrieved IPv6 connecting address match with 32 bits that form the retrieved IPv4 address, and
the changing unit is configured to change the priority of the IPv6 connecting address that is determined that the consecutive 32 bits and the 32 bits that form the retrieved IPv4 address are matched.

3. The apparatus according to claim 1, wherein
the determining unit is configured to determine whether the consecutive 32 bits that are in multiples of 4, 8, 16, 32, 48 or 64 from the first bit of the IPv6 connecting address match with 32 bits that form the retrieved IPv4 address, and
the changing unit is configured to change the priority of the IPv6 connecting address that is determined that consecutive 32 bits and the 32 bits that form the retrieved IPv4 address are matched.

4. The apparatus according to claim 1, wherein
the IPv6 connecting address is at least any of a IPv6 address and an extended address that is extended to an address length of the IPv6 address by adding a predetermined bit string to the IPv4 address,
the determining unit is configured to determine that the IPv6 connecting address is the extended address when the second bit string is included in the first bit string, and to determine that the IPv6 connecting address is the IPv6 address when the second bit string is not included in the first bit string, and a changing unit is configured to lower the priority of the IPv6 connecting address that is determined as the extended address than the priority of the IPv6 address.

5. The apparatus according to claim 1 further comprising:
a transmitter configured to transmit to a Domain Name System (DNS) server on the network, an address query message that queries about the IPv6 address of the external communication apparatus or the IPv4 address of the external communication apparatus, wherein
the first retrieving unit is configured to retrieve the IPv6 connecting address transmitted from the DNS server, and
the second retrieving unit is configured to retrieve the IPv4 address transmitted from the DNS server.

6. A computer-implemented method of address selection comprising:
retrieving, using a processing unit, IPv6 connecting addresses for connecting to an external communication apparatus on a network;
retrieving, using the processing unit, an IPv4 address assigned to the external communication apparatus;
setting, using the processing unit, for each retrieved IPv6 connecting address, a priority for representing a level preferably used when connecting to the external communication apparatus;
determining, using the processing unit, for each retrieved IPv6 connecting address, whether a second bit string that forms the retrieved IPv4 address is included in a first bit string that forms the IPv6 connecting address;
changing, using the processing unit, the priority of the IPv6 connecting address that is determined that the second bit string is included in the first bit string from among the retrieved IPv6 connecting addresses; and
selecting, using the processing unit, a IPv6 connecting address having a higher priority during establishing a connection with the external communication apparatus.

7. A computer program product having a computer readable non-transitory medium including instructions for causing a computer to select an address, wherein the instructions, when executed by the computer, cause the computer to perform:
retrieving IPv6 connecting addresses to an external communication apparatus on a network;
retrieving an IPv4 address assigned to the external communication apparatus;
setting for each retrieved IPv6 connecting address, a priority for representing a level preferably used when connecting to the external communication apparatus;
determining for each retrieved IPv6 connecting address, whether a second bit string that forms the retrieved IPv4 address is included in a first bit string that forms the IPv6 connecting address;
changing the priority of the IPv6 connecting address that is determined that the second bit string is included in the first bit string from among the retrieved IPv6 connecting addresses; and
selecting a IPv6 connecting address having a higher priority during establishing a connection with the external communication apparatus.

* * * * *